United States Patent
Fukuta et al.

(10) Patent No.: US 10,593,965 B2
(45) Date of Patent: Mar. 17, 2020

(54) METHOD AND APPARATUS FOR MANUFACTURING RESIN-FRAMED MEMBRANE ELECTRODE ASSEMBLY

(71) Applicant: HONDA MOTOR CO., LTD., Tokyo (JP)

(72) Inventors: Masahiro Fukuta, Wako (JP); Takahiro Tanaka, Wako (JP); Yohei Kataoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 484 days.

(21) Appl. No.: 15/373,460

(22) Filed: Dec. 9, 2016

(65) Prior Publication Data

US 2017/0170493 A1    Jun. 15, 2017

(30) Foreign Application Priority Data

Dec. 10, 2015  (JP) .................................. 2015-240874

(51) Int. Cl.
*H01M 8/0273* (2016.01)
*H01M 8/1004* (2016.01)

(52) U.S. Cl.
CPC ....... *H01M 8/0273* (2013.01); *H01M 8/1004* (2013.01); *Y02P 70/56* (2015.11)

(58) Field of Classification Search
CPC .................................................. H01M 8/0273
See application file for complete search history.

(56) References Cited

U.S. PATENT DOCUMENTS

| 5,480,739 A | * | 1/1996 | Kawasaki | C23C 4/18 29/623.5 |
| 2004/0173072 A1 | * | 9/2004 | Ishii | H01M 4/8605 83/100 |
| 2008/0280180 A1 | * | 11/2008 | Correa | B01J 8/003 429/479 |
| 2014/0004442 A1 | * | 1/2014 | Mitsuta | H01M 8/1004 429/481 |

FOREIGN PATENT DOCUMENTS

| JP | 2013-131417 | 7/2013 |
| JP | 2014-216230 | 11/2014 |

* cited by examiner

*Primary Examiner* — Niki Bakhtiari
(74) *Attorney, Agent, or Firm* — Mori & Ward, LLP

(57) ABSTRACT

A method for manufacturing a resin-framed membrane electrode assembly including a stepped MEA and a resin frame member, the method includes using a first suction mechanism to hold the stepped MEA on a worktable. The stepped MBA includes a solid polymer electrolyte membrane sandwiched between a first electrode and a second electrode having an area smaller than an area of the first electrode. A second suction mechanism is used to hold a film member including the frame-shaped adhesive layer to be placed on the stepped MEA held by the first suction mechanism. The film member is peeled from the stepped MEA after the frame-shaped adhesive layer has been affixed to the stepped MEA. The resin frame member is joined to an outer peripheral surface of the solid polymer electrolyte membrane of the stepped MEA via the frame-shaped adhesive layer. The outer peripheral surface is exposed from the second electrode.

10 Claims, 16 Drawing Sheets

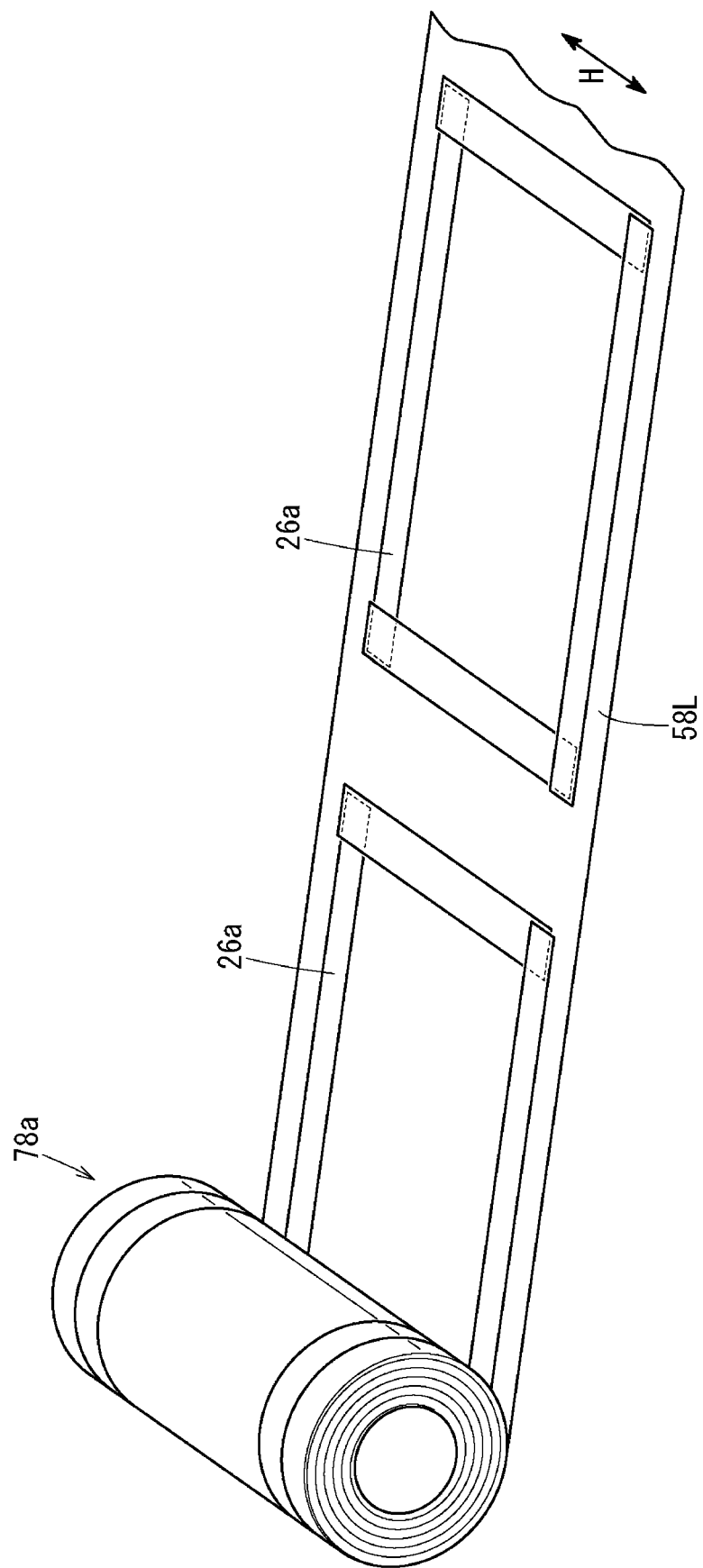

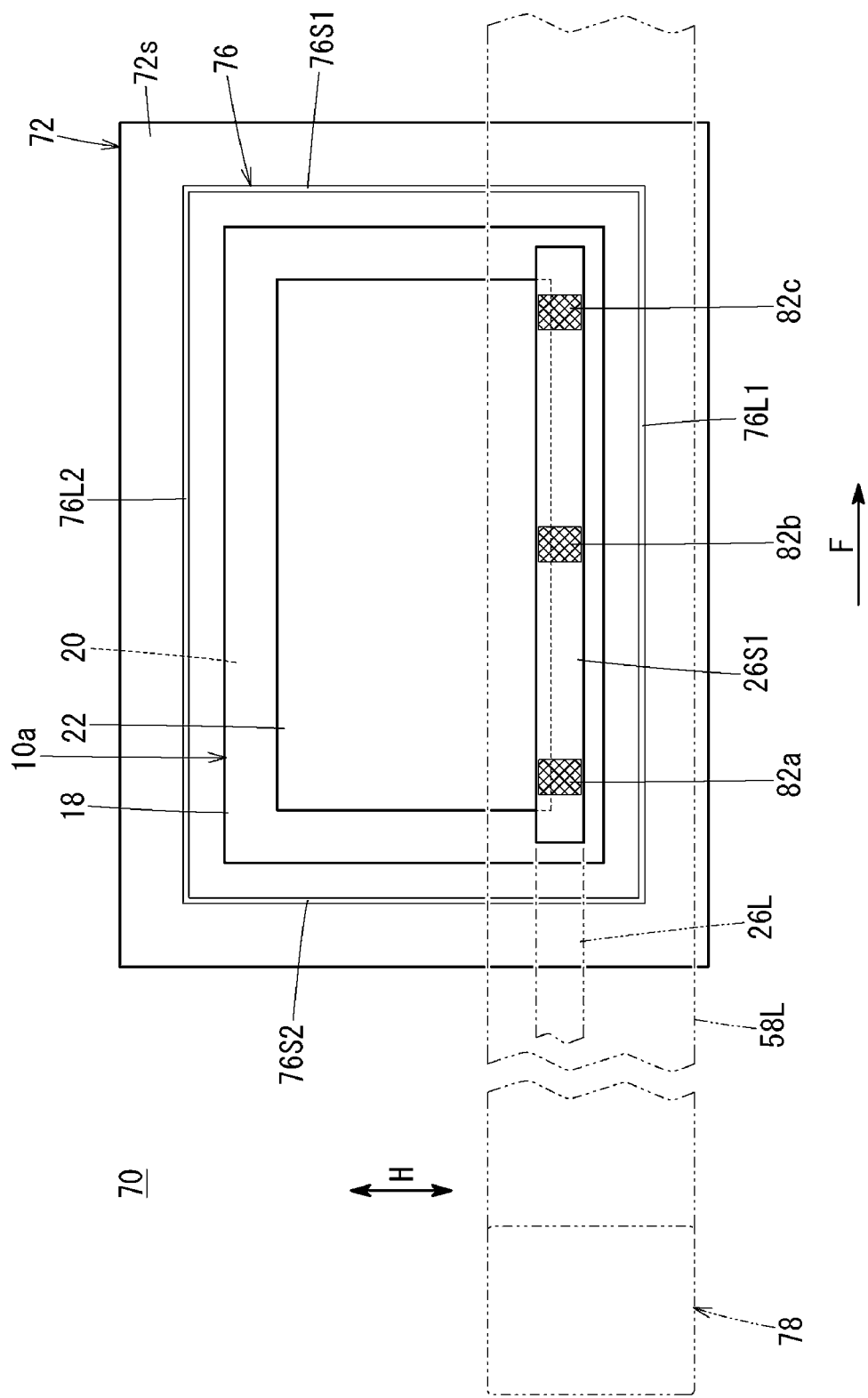

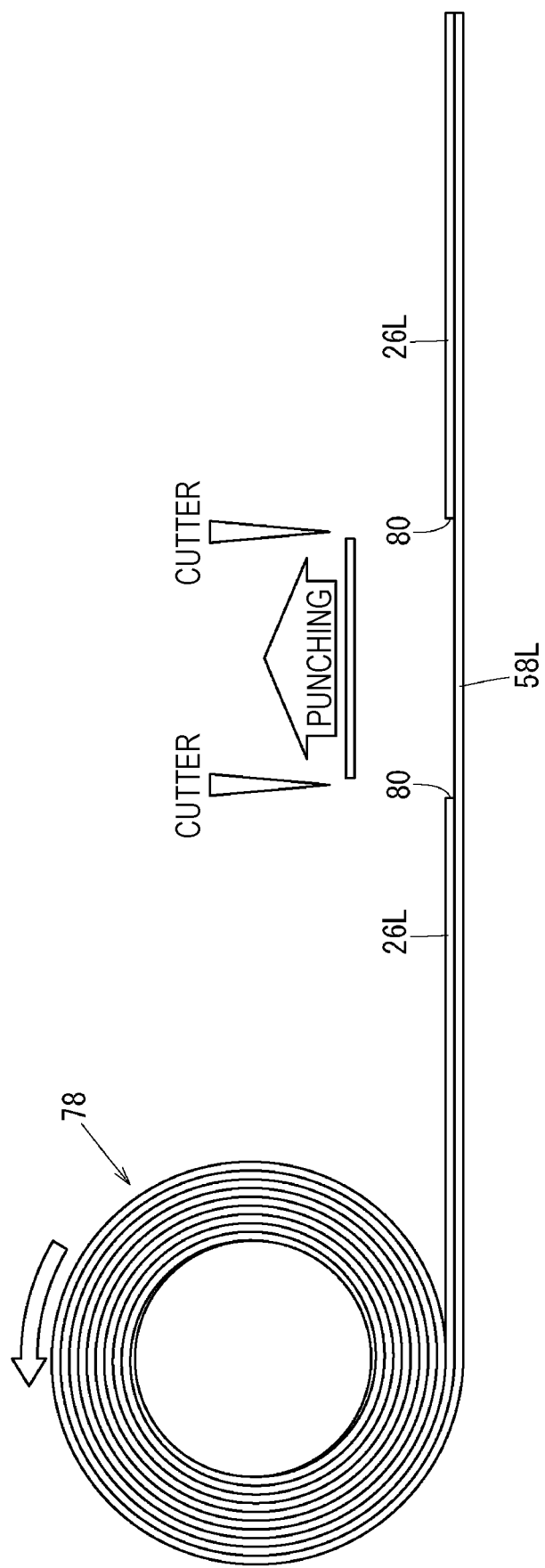

METHOD AND APPARATUS FOR MANUFACTURING RESIN-FRAMED MEMBRANE ELECTRODE ASSEMBLY

CROSS-REFERENCE TO RELATED APPLICATIONS

The present application claims priority under 35 U.S.C. § 119 to Japanese Patent Application No. 2015-240874, filed Dec. 10, 2015, entitled "Method and Apparatus for Manufacturing Resin-Framed Membrane Electrode Assembly." The contents of this application are incorporated herein by reference in their entirety.

BACKGROUND

1. Field

The present disclosure relates to a method and an apparatus for manufacturing a resin-framed membrane electrode assembly.

2. Description of the Related Art

In general, a solid polymer electrolyte membrane (solid polymer ion-exchange membrane) is used in a solid polymer electrolyte fuel cell. The fuel cell includes a membrane electrode assembly (MEA), in which an anode electrode is disposed on one surface of the solid polymer electrolyte membrane and a cathode electrode is disposed on the other surface of the solid polymer electrolyte membrane. The anode electrode and the cathode electrode each include a catalyst layer (electrode catalyst layer) and a gas diffusion layer (porous carbon).

The membrane electrode assembly and separators (bipolar plates), sandwiching the membrane electrode assembly, constitute a power generation cell (unit fuel cell). A predetermined number of such power generation cells are stacked and used, for example, as a vehicle fuel cell stack.

In some membrane electrode assemblies, one of the gas diffusion layers has smaller planar dimensions than the solid polymer electrolyte membrane and the other gas diffusion layer has substantially the same planar dimensions as the solid polymer electrolyte membrane. Such a membrane electrode assembly is called a stepped MEA. A stepped MEA may be structured as a resin-framed MEA, that is, the stepped MEA includes a resin frame member so that the amount of the solid polymer electrolyte membrane, which is comparatively expensive, can be reduced and so that the solid polymer electrolyte membrane, which is thin and flimsy, can be protected.

Japanese Unexamined Patent Application Publication No. 2013-131417, for example, describes a method for manufacturing a resin-framed membrane electrode assembly for a fuel cell. In the manufacturing method, an inner peripheral protrusion of a resin frame member and an outer peripheral edge of a solid polymer electrolyte membrane are fixed to each other by using an adhesive layer that is made from, for example, an ester, acrylic, or urethane hot-melt adhesive.

As described in, for example, Japanese Unexamined Patent Application Publication No. 2014-216230, a suction jig is usually used in a method for manufacturing an MEA. The method described in Japanese Unexamined Patent Application Publication No. 2014-216230 includes a step of applying a catalyst ink to a substrate while holding the substrate on a suction surface of a porous member of the suction jig. Accordingly, in the method for manufacturing a resin-framed MEA, the adhesive layer is disposed on the membrane electrode assembly in a state in which the membrane electrode assembly is sucked and held by the suction jig.

SUMMARY

According to a first aspect of the present invention, a method for manufacturing a resin-framed membrane electrode assembly for a fuel cell, the resin-framed membrane electrode assembly including a stepped MEA that includes a solid polymer electrolyte membrane, a first electrode disposed on one surface of the solid polymer electrolyte membrane, and a second electrode disposed on the other surface of the solid polymer electrolyte membrane, wherein the first electrode has planar dimensions larger than those of the second electrode, and a resin frame member that is joined to an outer peripheral surface of the solid polymer electrolyte membrane by using a frame-shaped adhesive layer, the outer peripheral surface being exposed outward from the second electrode, the method includes a step of sucking and holding the stepped MEA on a worktable by using a first suction mechanism. The method includes a step of sucking and holding a film member including the adhesive layer by using a second suction mechanism so that the adhesive layer overlaps the stepped MEA in a state in which the stepped MEA is sucked and held by the first suction mechanism. The method includes a step of peeling off the film member after the adhesive layer has been affixed to the stepped MEA. The method includes a step of joining the stepped MEA and the resin frame member to each other by using the adhesive layer.

According to a second aspect of the present invention, a method for manufacturing a resin-framed membrane electrode assembly including a stepped MEA and a resin frame member, the method includes using a first suction mechanism to hold the stepped MEA on a worktable. The stepped MEA includes a solid polymer electrolyte membrane sandwiched between a first electrode and a second electrode having an area smaller than an area of the first electrode. A second suction mechanism is used to hold a film member including the frame-shaped adhesive layer to be placed on the stepped MEA held by the first suction mechanism. The film member is peeled from the stepped MEA after the frame-shaped adhesive layer has been affixed to the stepped MEA. The resin frame member is joined to an outer peripheral surface of the solid polymer electrolyte membrane of the stepped MEA via the frame-shaped adhesive layer. The outer peripheral surface is exposed from the second electrode.

According to a third aspect of the present invention, an apparatus for manufacturing a resin-framed membrane electrode assembly including a stepped MEA and a resin frame member, the apparatus includes a first suction mechanism and a second suction mechanism. The first suction mechanism holds the stepped MEA on a worktable. The stepped MEA includes a solid polymer electrolyte membrane sandwiched between a first electrode and a second electrode having an area smaller than an area of the first electrode. The second suction mechanism holds a film member including the frame-shaped adhesive layer to be placed on the stepped MEA held by the first suction mechanism. The resin frame member is joined to an outer peripheral surface of the solid polymer electrolyte membrane of the stepped MEA via the frame-shaped adhesive layer. The outer peripheral surface being exposed from the second electrode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 14 is a perspective view of another film roll.

FIG. 15 illustrates a manufacturing method according to a third embodiment of the present disclosure.

FIG. 16 illustrates a manufacturing method according to a fourth embodiment of the present disclosure.

DESCRIPTION OF THE EMBODIMENTS

Figure 1:
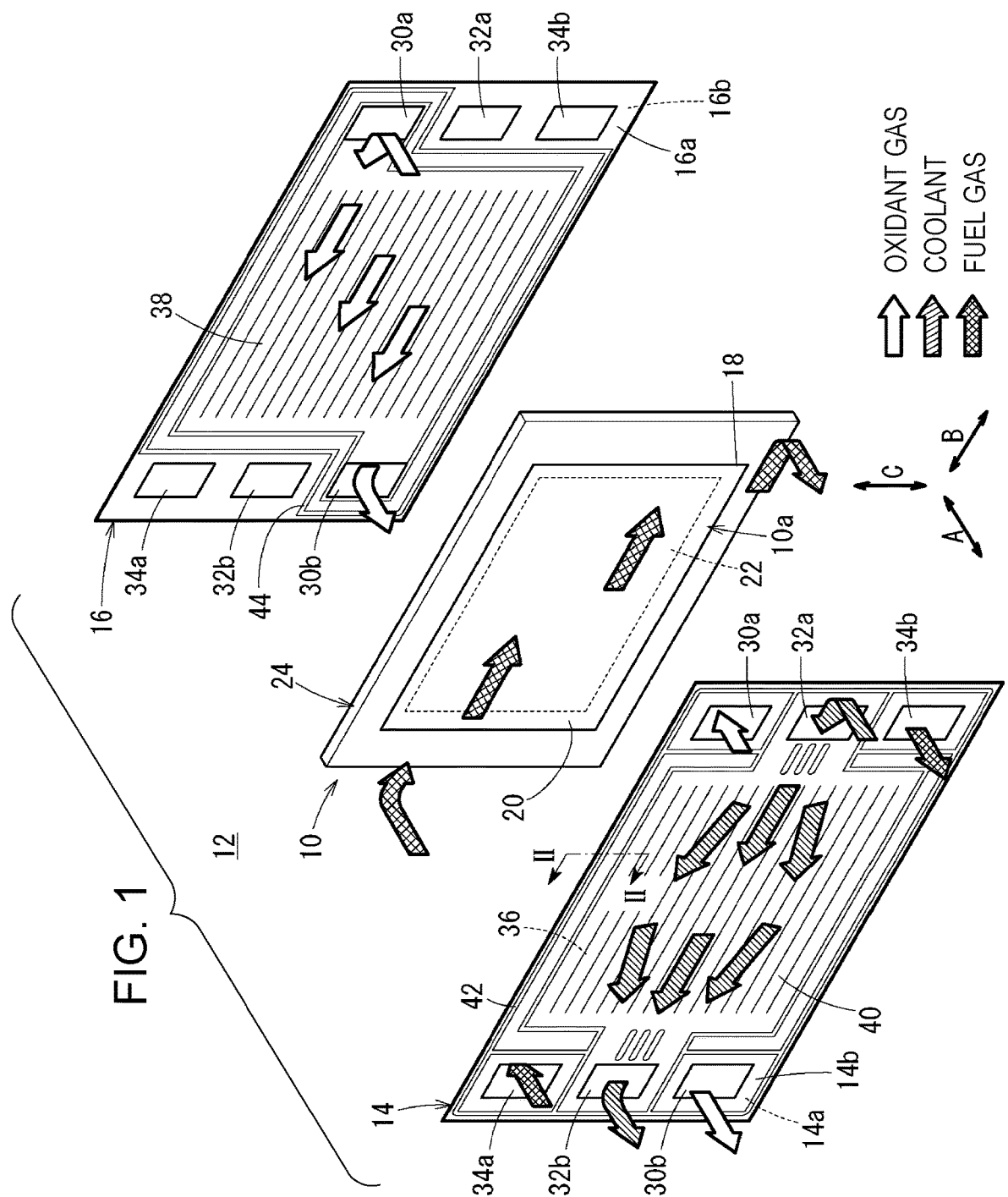
FIG. 1 is an exploded perspective view of a solid polymer power generation cell including a resin-framed membrane electrode assembly that is manufactured by using a manufacturing method according to the present disclosure.

The embodiments will now be described with reference to the accompanying drawings, wherein like reference numerals designate corresponding or identical elements throughout the various drawings.

Figure 2:
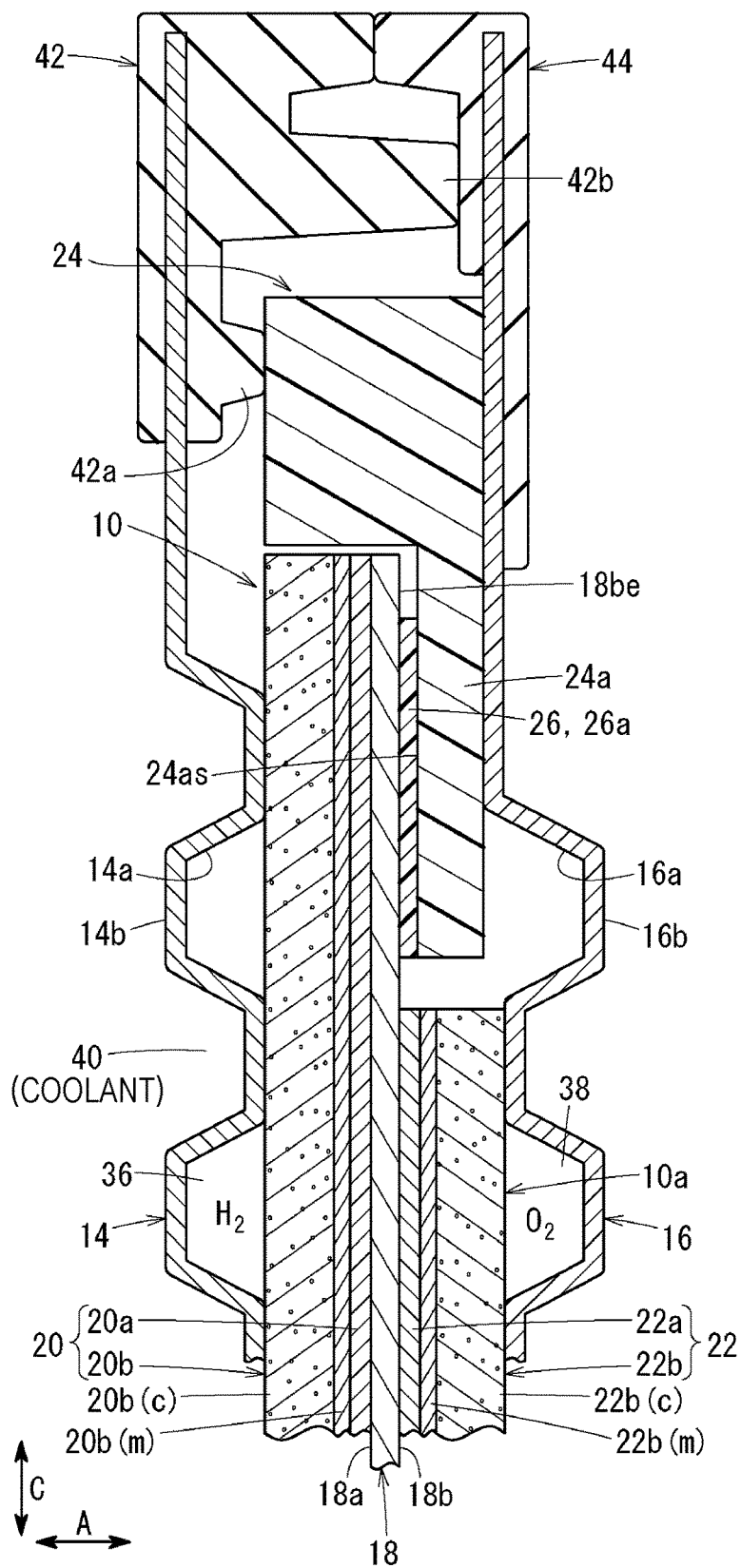
FIG. 2 is a sectional view of the power generation cell taken along line II-II in FIG. 1.

FIGS. 1 and 2 illustrate a resin-framed membrane electrode assembly 10 that is manufactured by using a method according to the present disclosure. The resin-framed membrane electrode assembly 10 is incorporated in a solid polymer power generation cell 12 (unit cell), which has a horizontally elongated (or vertically elongated) rectangular shape. A fuel cell stack includes a plurality of power generation cells 12 that are stacked, for example, in the direction of arrow A (horizontal direction) or in the direction of arrow C (direction of gravity). The fuel cell stack is mounted, for example, as a vehicle fuel cell stack in a fuel cell electric vehicle (not shown).

In the power generation cell 12, the resin-framed membrane electrode assembly 10 is sandwiched between a first separator 14 and a second separator 16. The first separator 14 and the second separator 16 each have a horizontally elongated (or vertically elongated) rectangular shape. The first separator 14 and the second separator 16 are each made of a metal plate, a carbon plate, or the like. Examples of the metal plate include a steel plate, a stainless steel plate, an aluminum plate, a galvanized steel plate, and the like. The metal plate may be anticorrosive coated.

The resin-framed membrane electrode assembly 10, which has a rectangular shape, includes a stepped MEA 10a. Referring to FIG. 2, the stepped MEA 10a includes a solid polymer electrolyte membrane 18, and an anode electrode 20 (first electrode) and a cathode electrode 22 (second electrode) that sandwich the solid polymer electrolyte membrane 18. The solid polymer electrolyte membrane 18 is, for example, a thin film that is made of a perfluorosulfonic acid polymer and soaked with water. The solid polymer electrolyte membrane 18, which is a cation-exchange membrane, may be made of, for example, a fluorinated electrolyte or a hydrocarbon (HC) electrolyte.

The cathode electrode 22 has smaller planar dimensions (outside dimensions) than the solid polymer electrolyte membrane 18 and the anode electrode 20. The solid polymer electrolyte membrane 18 and the anode electrode 20 have the same planer dimensions. Alternatively, the anode electrode 20 may have smaller planar dimensions than the solid polymer electrolyte membrane 18 and the cathode electrode 22. In this case, the anode electrode 20 is the second electrode, and the cathode electrode 22 is the first electrode.

Referring to FIG. 2, the anode electrode 20 includes a first electrode catalyst layer 20a, which is joined to a surface 18a of the solid polymer electrolyte membrane 18, and a first gas diffusion layer 20b, which is stacked on the first electrode catalyst layer 20a. The first electrode catalyst layer 20a and the first gas diffusion layer 20b have the same planar dimensions (outer dimension), which are the same as (or smaller than) those of the solid polymer electrolyte membrane 18. The first electrode catalyst layer 20a may have smaller planar dimensions (or the larger planar dimensions) than the first gas diffusion layer 20b.

The cathode electrode 22 includes a second electrode catalyst layer 22a, which is joined to a surface 18b of the solid polymer electrolyte membrane 18, and a second gas diffusion layer 22b, which is stacked on the second electrode catalyst layer 22a. The second electrode catalyst layer 22a and the second gas diffusion layer 22b have the same planar dimensions, which are smaller than those of the solid polymer electrolyte membrane 18. The surface 18b of the solid polymer electrolyte membrane 18 includes an exposed surface 18be, which is an outer peripheral part of the surface 18b that is exposed outward from the cathode electrode 22.

The second electrode catalyst layer 22a and the second gas diffusion layer 22b have the same planar dimensions. Alternatively, the second electrode catalyst layer 22a may have larger (or smaller) planar dimensions than the second gas diffusion layer 22b.

The first electrode catalyst layer 20a is formed by, for example, uniformly coating a surface of the first gas diffusion layer 20b with porous carbon particles whose surfaces support a platinum alloy. The second electrode catalyst layer 22a is formed by, for example, uniformly coating a surface of the second gas diffusion layer 22b with porous carbon particles whose surfaces support a platinum alloy.

The first gas diffusion layer 20b includes a microporous layer 20b(m), which is porous and electroconductive; and a carbon layer 20b(c), which is made of carbon paper, carbon cloth, or the like. The second gas diffusion layer 22b includes a microporous layer 22b(m), which is porous and electroconductive; and a carbon layer 22b(c), which is made of carbon paper, carbon cloth, or the like. The second gas diffusion layer 22b has smaller planar dimensions than the first gas diffusion layer 20b.

The first electrode catalyst layer 20a and the second electrode catalyst layer 22a are respectively formed on the surface 18a and the surface 18b of the solid polymer electrolyte membrane 18. The microporous layers 20b(m) and 22b(m) may be omitted as appropriate.

The resin-framed membrane electrode assembly 10 includes a resin frame member 24 (a resin member having an irregular cross-sectional shape or a resin film having a uniform thickness), which is joined to the exposed surface 18be of the solid polymer electrolyte membrane 18.

The resin frame member 24 may be made of, for example, polyphenylene sulfide (PPS), polyphthalamide (PPA), polyethylene naphthalate (PEN), polyethersulfone (PES), liquid crystal polymer (LCP), polyvinylidene fluoride (PVDF), silicone resin, fluororesin, modified-polyphenylene ether resin (m-PPE), polyethylene terephthalate (PET), polybutylene terephthalate (PBT), modified polyolefin, or the like.

The resin frame member 24 includes a thin inner protruding portion 24a. The inner protruding portion 24a has an adhesion surface 24as, which is joined to the exposed surface 18be of the solid polymer electrolyte membrane 18. A frame-shaped adhesive layer 26 is disposed between the exposed surface 18be of the solid polymer electrolyte membrane 18 and the adhesion surface 24as of the resin frame member 24. The frame-shaped adhesive layer 26 is made from an adhesive film 26a, which is, for example, a hot-melt sheet.

Referring to FIG. 1, an oxidant gas inlet manifold 30a, a coolant inlet manifold 32a, and a fuel gas outlet manifold 34b are formed in the power generation cell 12 so as to extend in the direction of arrow A, which is the stacking direction, through one end portion of the power generation cell 12 in the direction of arrow B (horizontal direction in FIG. 1). An oxidant gas, such as an oxygen-containing gas, is supplied through the oxidant gas inlet manifold 30a. A coolant is supplied through the coolant inlet manifold 32a. A fuel gas, such as a hydrogen-containing gas, is discharged through the fuel gas outlet manifold 34b. The oxidant gas inlet manifold 30a, the coolant inlet manifold 32a, and the fuel gas outlet manifold 34b are arranged in the direction of arrow C (vertical direction).

A fuel gas inlet manifold 34a, a coolant outlet manifold 32b, and an oxidant gas outlet manifold 30b are formed in the power generation cell 12 so as to extend in the direction of arrow A through the other end portion of the power generation cell 12 in the direction of arrow B. The fuel gas is supplied through the fuel gas inlet manifold 34a. The coolant is discharged through the coolant outlet manifold 32b. The oxidant gas is discharged through the oxidant gas outlet manifold 30b. The fuel gas inlet manifold 34a, the coolant outlet manifold 32b, and the oxidant gas outlet manifold 30b are arranged in the direction of arrow C.

The oxidant gas inlet manifold 30a, the coolant inlet manifold 32a, the fuel gas outlet manifold 34b, the fuel gas inlet manifold 34a, the coolant outlet manifold 32b, and the oxidant gas outlet manifold 30b are not formed in the resin frame member 24. That is, the outer periphery of the resin frame member 24 is located inside of these six manifolds.

A fuel gas channel 36, which is connected to the fuel gas inlet manifold 34a and the fuel gas outlet manifold 34b, is formed on a surface 14a of the first separator 14 facing the resin-framed membrane electrode assembly 10 so as to extend in the direction of arrow B. The fuel gas channel 36 includes a plurality of wave-shaped channel grooves or linear channel grooves.

An oxidant gas channel 38, which is connected to the oxidant gas inlet manifold 30a and the oxidant gas outlet manifold 30b, is formed on a surface 16a of the second separator 16 facing the resin-framed membrane electrode assembly 10 so as to extend in the direction of arrow B. The oxidant gas channel 38 includes a plurality of wave-shaped channel grooves or linear channel grooves.

A coolant channel 40, which is connected to the coolant inlet manifold 32a and the coolant outlet manifold 32b, is formed between a surface 14b of the first separator 14 of the power generation cell 12 and a surface 16b of the second separator 16 of an adjacent power generation cell 12 so as to extend in the direction of arrow B. The coolant channel 40 includes a plurality of channel grooves.

Referring to FIGS. 1 and 2, a first sealing member 42 is integrally formed on the surfaces 14a and 14b of the first separator 14 so as to surround the outer periphery of the first separator 14. A second sealing member 44 is integrally formed on the surfaces 16a and 16b of the second separator 16 so as to surround the outer periphery of the second separator 16.

Referring to FIG. 2, the first sealing member 42 includes a first protruding seal 42a, which is in contact with the resin frame member 24 of the resin-framed membrane electrode assembly 10, and a second protruding seal 42b, which is in contact with the second sealing member 44 of the second separator 16. The second sealing member 44 includes a planar seal having a contact surface that is in contact with the second protruding seal 42b and that extends along the separator surface. Instead of the second protruding seal 42b of the first sealing member 42, the second sealing member 44 may have a protruding seal (not shown).

Each of the first sealing member 42 and the second sealing member 44 is made of an elastic material, such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene rubber, and acrylic rubber.

Next, a method for manufacturing the resin-framed membrane electrode assembly 10 according to a first embodiment of the present disclosure will be described.

First, the stepped MEA 10a is manufactured. As the resin frame member 24, a member that is made by injection molding a resin by using a die (not shown) or a member that is made by cutting a film so as to have a frame-like shape by using a cutting ruler is prepared.

Figure 3:
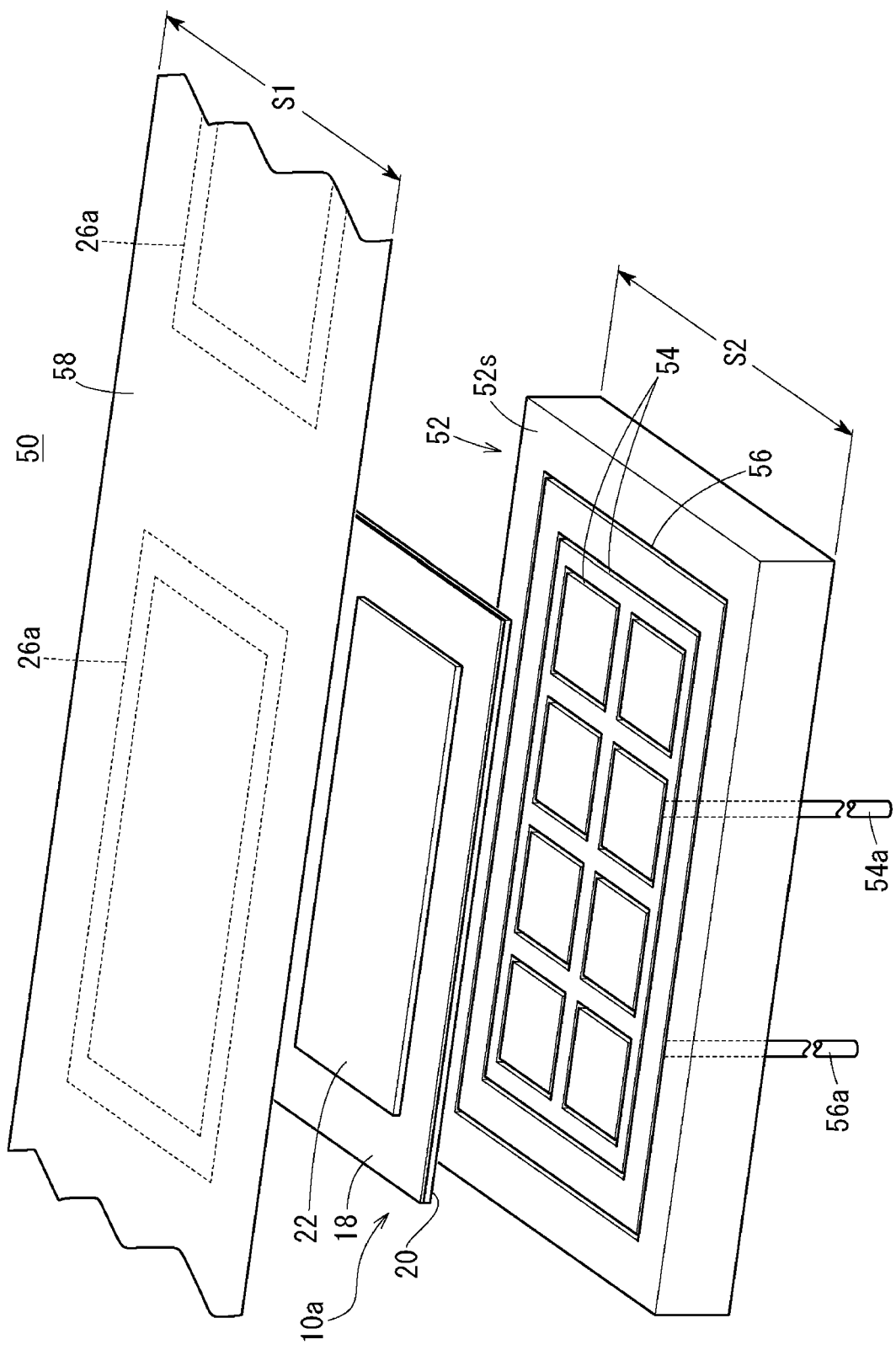
FIG. 3 is a perspective view of a manufacturing apparatus, a stepped MEA, and a film member that are used for a manufacturing method according to a first embodiment of the present disclosure.

FIG. 3 illustrates a manufacturing apparatus 50 for manufacturing the resin-framed membrane electrode assembly 10. The manufacturing apparatus 50 includes a worktable 52. An inner suction line 54 (first suction mechanism) and an outer suction line 56 (second suction mechanism) are formed in an upper surface 52s (placement surface) of the worktable 52.

The inner suction line 54 includes, for example, grid-shaped grooves. The inner suction line 54 has dimensions smaller than the planar dimensions of the anode electrode 20 of the stepped MEA 10a. The outer suction line 56 is, for example, a rectangular groove that surrounds the inner suction line 54. The outer suction line 56 has dimensions larger than the planar dimensions of the stepped MEA 10a.

A first suction tube 54a is connected to the inner suction line 54 through a plurality of small holes extending through the worktable 52. A suction source (not shown) is connected to the first suction tube 54a. A second suction tube 56a is connected to the outer suction line 56 through a plurality of small holes extending through the worktable 52. A suction source (not shown) is connected to the second suction tube 56a. The first suction tube 54a and the second suction tube 56a are independently sucked. The inner suction line 54 and the outer suction line 56 each may be composed of a plurality of small holes.

Then, the stepped MEA 10a is sucked onto the worktable 52. To be specific, the stepped MEA 10a is placed on the upper surface 52s of the worktable 52 so that the anode electrode 20 faces downward. When the inner suction line 54 of the worktable 52 is sucked through the first suction tube 54a, the stepped MEA 10a is sucked and held on the upper surface 52s of the worktable 52 while utilizing a characteristic of an ion-exchange membrane in that the membrane allows slight air leakage.

A film member 58 (carrier film) is prepared. The film member 58 is an elongated sheet that is made of, for example, polyethylene terephthalate (PET). The film member 58 includes a plurality of adhesive films 26a, each of which has a rectangular frame-like shape and which are arranged at regular intervals. The thickness of the adhesive film 26a is in the range of several micrometers to 250 µm.

The film member 58 may be a rectangular member that includes only one adhesive film 26a. (In this case, the film member 58 has substantially the same dimensions as the worktable 52.) The width S1 of the film member 58 is substantially the same as the width S2 of the worktable 52. That is, the width S1 may be slightly larger than or slightly smaller than the width S2.

Figure 4:
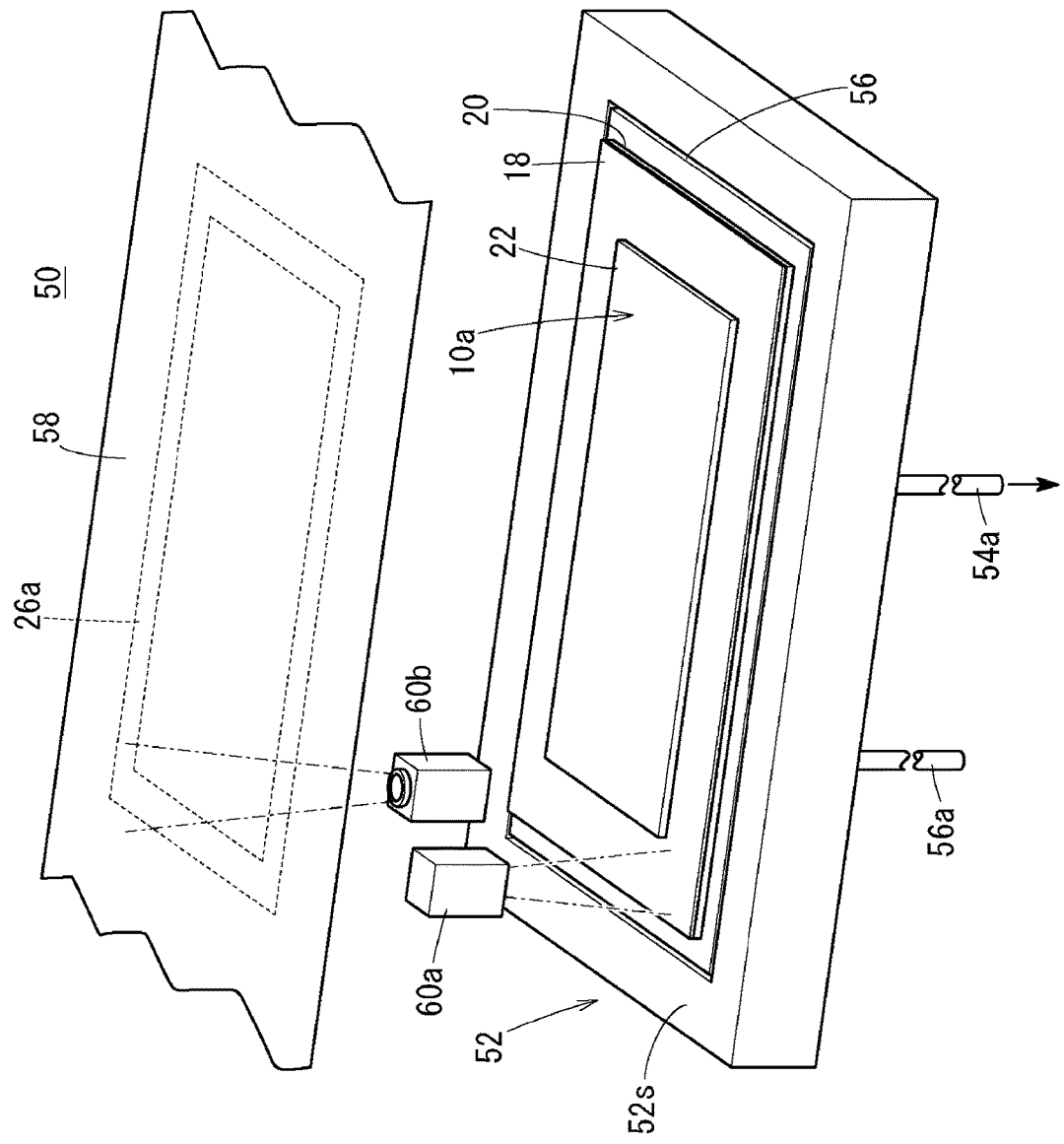
FIG. 4 illustrates an operation of positioning the stepped MEA and the film member in the manufacturing method.
Figure 5:
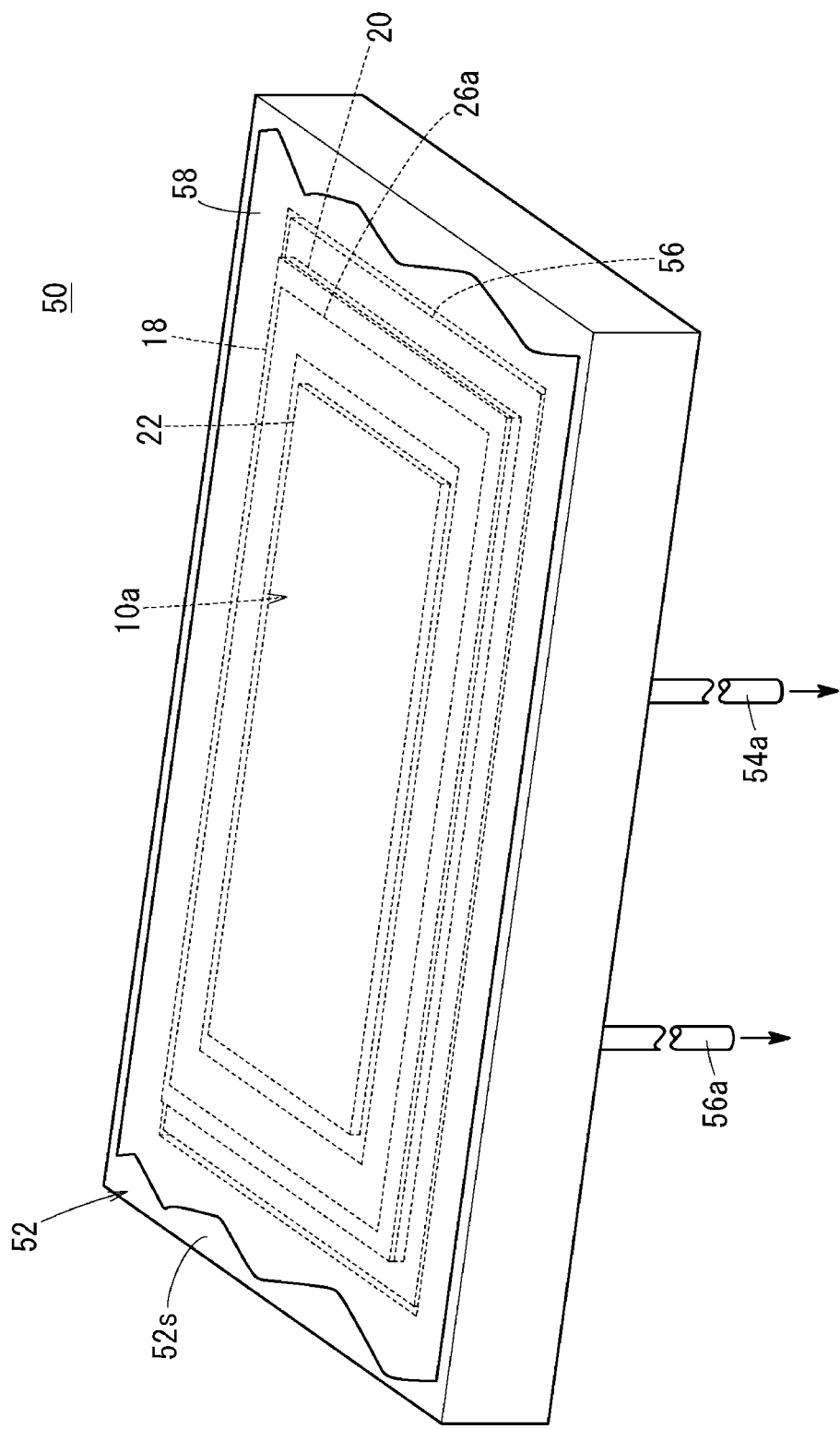
FIG. 5 illustrates an operation of sucking and holding the film member on the stepped MEA in the manufacturing method.

Next, referring to FIG. 4, the film member 58 is disposed above the worktable 52. Image sensors 60a and 60b detect the relative positions of the stepped MEA 10a and the adhesive film 26a. After adjusting the relative positions of the stepped MEA 10a and the adhesive film 26a, referring to FIG. 5, the film member 58 is placed on the stepped MEA 10a on the worktable 52, and the second suction tube 56a is sucked. Accordingly, the outer suction line 56 is sucked, and the film member 58 is sucked and held so that the adhesive film 26a overlaps the stepped MEA 10a.

Figure 6:
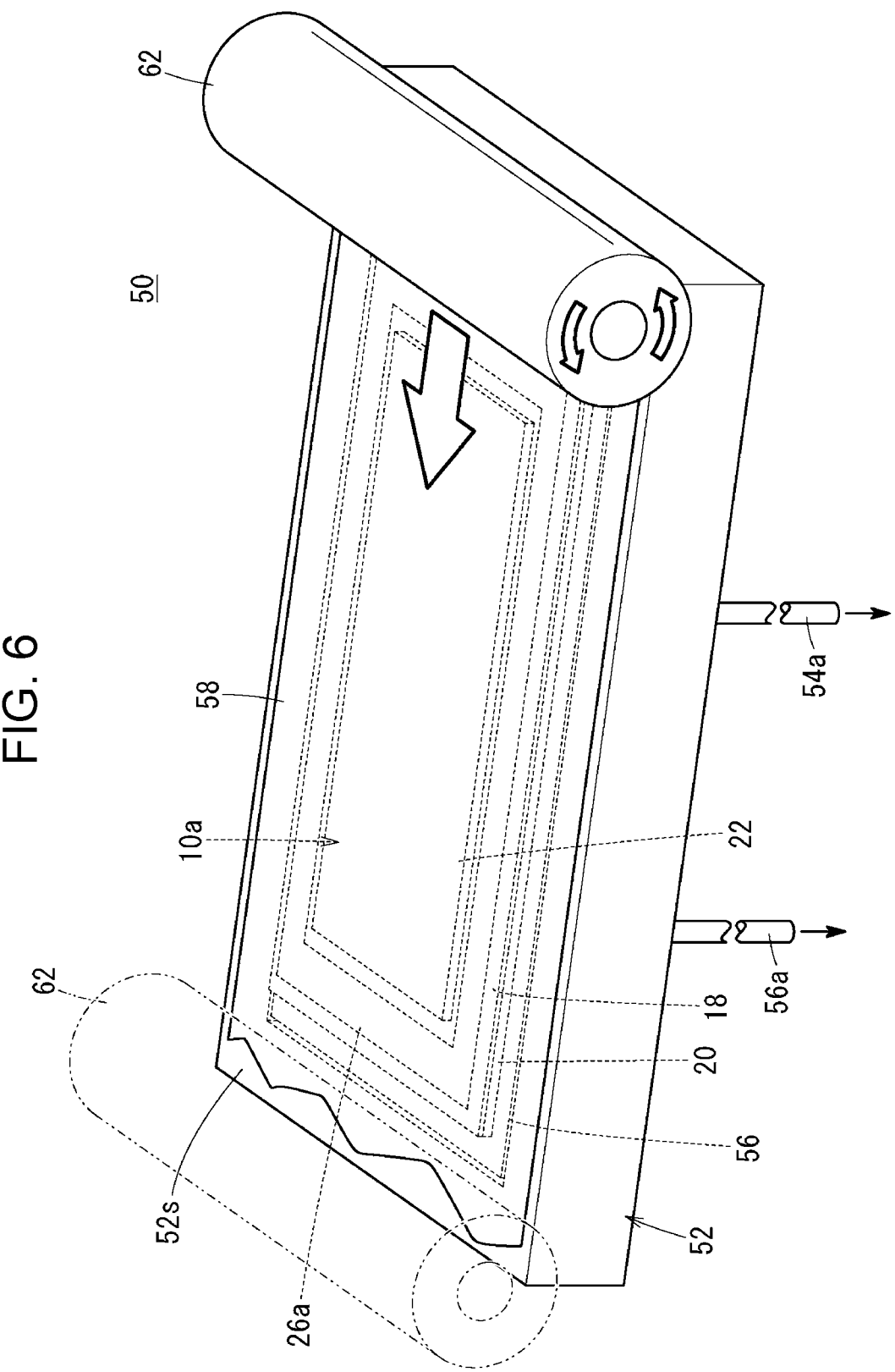
FIG. 6 illustrates an operation of affixing an adhesive film to the stepped MEA in the manufacturing method.

Referring to FIG. 6, a heater roller 62 presses and heats the stepped MEA 10a and the film member 58 in a state in which the stepped MEA 10a is sucked and held on the upper surface of 52s of the worktable 52 and the film member 58 is sucked and held so as to overlap the stepped MEA 10a. The adhesive film 26a is affixed to the stepped MEA 10a as the heater roller 62 rolls on the film member 58. Instead of using the heater roller 62, pressing and heating may be performed by using a heating plate having an appropriate shape corresponding to the shape of the adhesive film 26a. If the adhesive film 26a is a self-adhesive film, only pressing may be performed without performing heating.

After affixing the adhesive film 26a to the stepped MEA 10a, cooling is performed as necessary. Suction through the second suction tube 56a is stopped, and the film member 58 is peeled off the worktable 52. Subsequently, whether the adhesive film 26a has been appropriately affixed to the stepped MEA 10a is checked, suction through the first suction tube 54a is stopped, and the stepped MEA 10a is removed from the worktable 52.

Next, joint portions of the exposed surface 18be of the solid polymer electrolyte membrane 18 and the adhesion surface 24as of the resin frame member 24 are heated and pressed in a state in which the adhesive film 26a is disposed between the exposed surface 18be and the adhesion surface 24as. Thus, the stepped MEA 10a and the resin frame member 24 are joined to each other by using the frame-shaped adhesive layer 26, and the resin-framed membrane electrode assembly 10 is manufactured.

Referring to FIG. 3, in the first embodiment, the stepped MEA 10a is sucked and held on the upper surface of 52s of the worktable 52 by using the inner suction line 54. In this state, the film member 58, including the adhesive films 26a, is sucked and held on the stepped MEA 10a by using the outer suction line 56.

Accordingly, suction is performed in two steps, one of which is performed by using the inner suction line 54 and the other of which is performed by using the outer suction line 56. Therefore, an appropriate negative pressure can be generated, and displacement due to air leakage or pressing/heating can be reliably suppressed. Thus, in particular, even if the adhesive film 26a has a small thickness, the adhesive film 26a can have sufficient rigidity and can be handled easily, because the adhesive film 26a is included in the film member 58.

In addition, the adhesive film 26a is sucked and held on the stepped MEA 10a via the film member 58. Therefore, an advantage is obtained in that, through a simple process, the thin adhesive film 26a can be accurately and reliably affixed to a desired position on the stepped MEA 10a, and the stepped MEA 10a and the resin frame member 24 can be joined to each other with high accuracy.

Next, an operation of the power generation cell 12, which is structured as described above, will be described.

Referring to FIG. 1, an oxidant gas, such as an oxygen-containing gas, is supplied to the oxidant gas inlet manifold 30a. A fuel gas, such as a hydrogen-containing gas, is supplied to the fuel gas inlet manifold 34a. A coolant, such as pure water, ethylene glycol, or oil, or the like, is supplied to the coolant inlet manifold 32a.

The oxidant gas flows from the oxidant gas inlet manifold 30a into the oxidant gas channel 38 of the second separator 16, flows in the direction of arrow B, and is supplied to the cathode electrode 22 of the stepped MEA 10a. The fuel gas flows from the fuel gas inlet manifold 34a into the fuel gas channel 36 of the first separator 14. The fuel gas flows along the fuel gas channel 36 in the direction of arrow B and is supplied to the anode electrode 20 of the stepped MEA 10a.

In the stepped MEA 10a, the oxidant gas supplied to the cathode electrode 22 and the fuel gas supplied to the anode electrode 20 are consumed in electrochemical reactions in the second electrode catalyst layer 22a and the first electrode catalyst layer 20a, and thereby electric power is generated.

The oxidant gas supplied to the cathode electrode 22 and consumed is discharged along the oxidant gas outlet manifold 30b in the direction of arrow A. Likewise, the fuel gas supplied to the anode electrode 20 and consumed is discharged along the fuel gas outlet manifold 34b in the direction of arrow A.

The coolant supplied to the coolant inlet manifold 32a flows into the coolant channel 40 between the first separator 14 and the second separator 16 and flows in the direction of arrow B. After cooling the stepped MEA 10a, the coolant is discharged from the coolant outlet manifold 32b.

Figure 7:
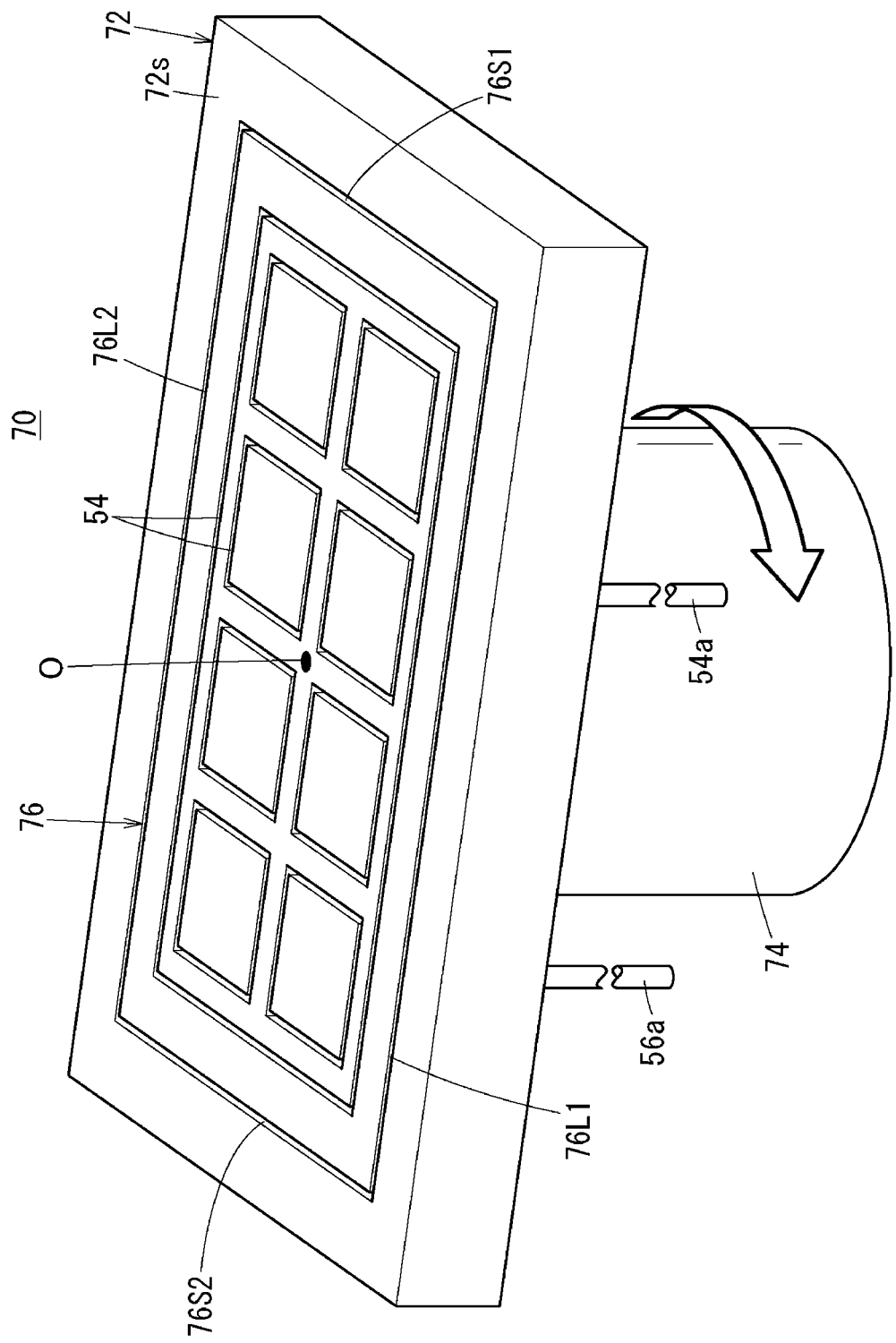
FIG. 7 illustrates a manufacturing apparatus used for a manufacturing method according to a second embodiment of the present disclosure.

FIG. 7 illustrates a manufacturing apparatus 70 that is used for a manufacturing method according to a second embodiment of the present disclosure. The manufacturing apparatus 70 includes a worktable 72. The worktable 72 can be rotated by using a rotation mechanism 74 around an axis O, which is perpendicular to a table surface. The inner suction line 54 (first suction mechanism) and an outer suction line 76 (second suction mechanism) are formed in an upper surface 72s (placement surface) of the worktable 72.

The axis O is located at the center of the inner suction line 54 and the outer suction line 76.

The outer suction line 76 is, for example, a rectangular groove that surrounds the inner suction line 54. The outer suction line 76 has dimensions larger than the planar dimensions of the stepped MEA 10a. The outer suction line 76 includes two long-side lines 76L1 and 76L2 and two short-side lines 76S1 and 76S2, which can be sucked independently.

Figure 8:
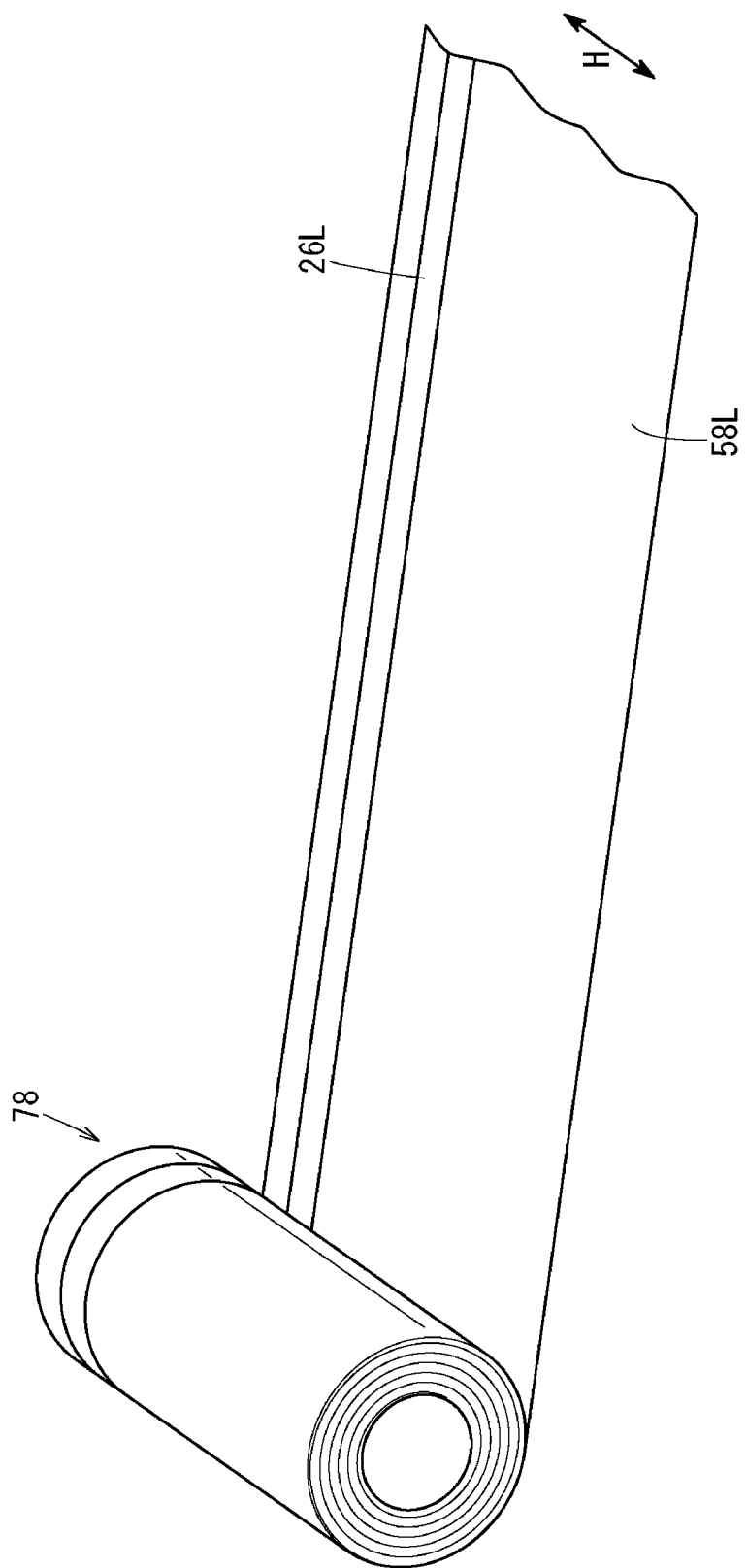
FIG. 8 is a perspective view of a film roll.

Referring to FIG. 8, a film roll 78 is used in the second embodiment. The film roll 78 includes an elongated film member 58L and an elongated adhesive film 26L, which are rolled. The adhesive film 26L is located adjacent to one end of the film member 58L in the width direction (direction of arrow H).

Figure 9:
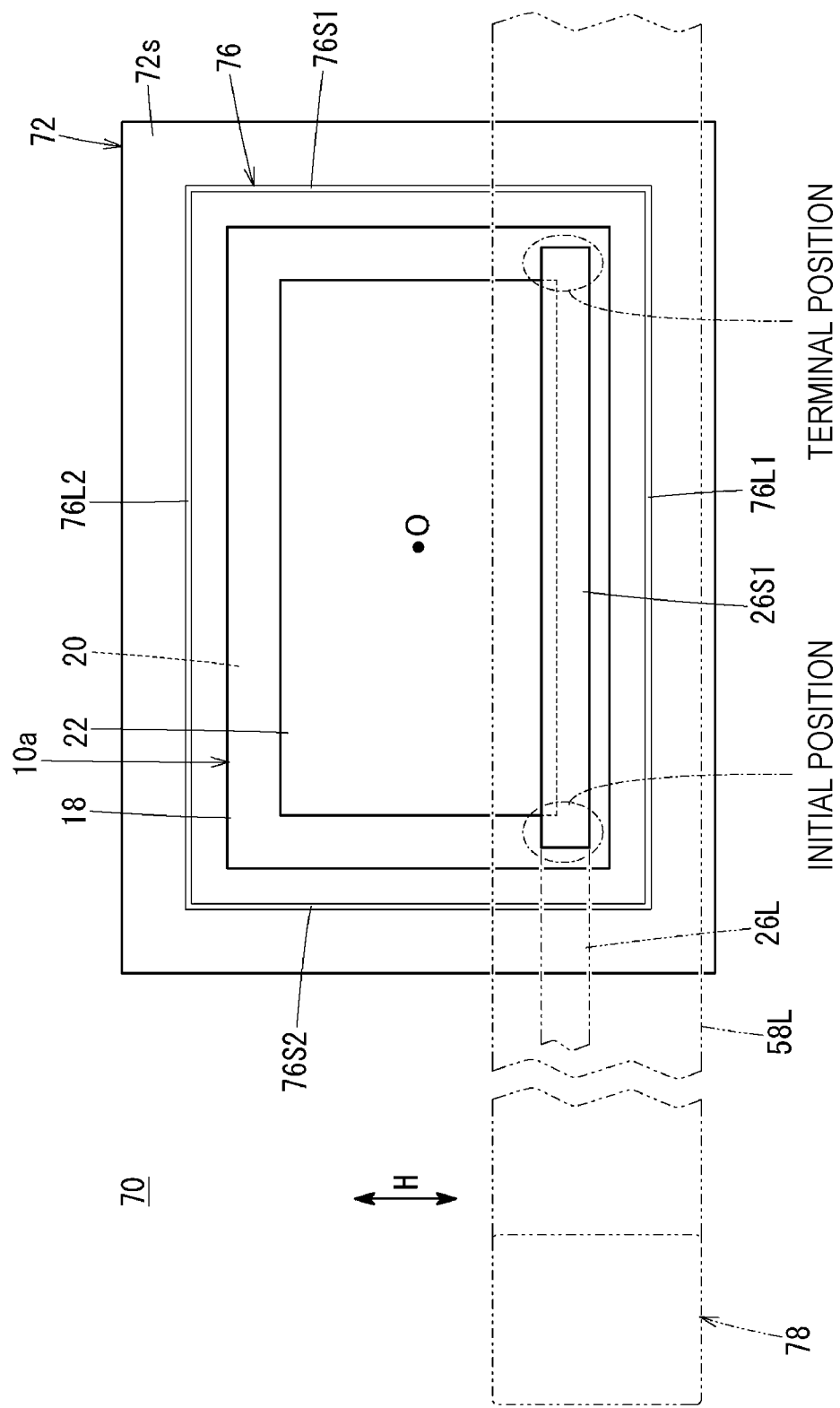
FIG. 9 illustrates an operation of affixing the adhesive film to one long side of the stepped MEA in the manufacturing method.

Referring to FIG. 9, the stepped MEA 10a is placed, sucked, and held on the upper surface 72s of the worktable 72. The film member 58L is dispensed from the film roll 78, and the adhesive film 26L is aligned with one long side of the stepped MEA 10a, which is a predetermined position to which the adhesive film 26L is to be affixed. Only the long-side line 76L1 of the outer suction line 76 of the worktable 72 is sucked. The film member 58L is sucked and held on the upper surface 72s of the worktable 72 so as to overlap the stepped MEA 10a.

Figure 10:
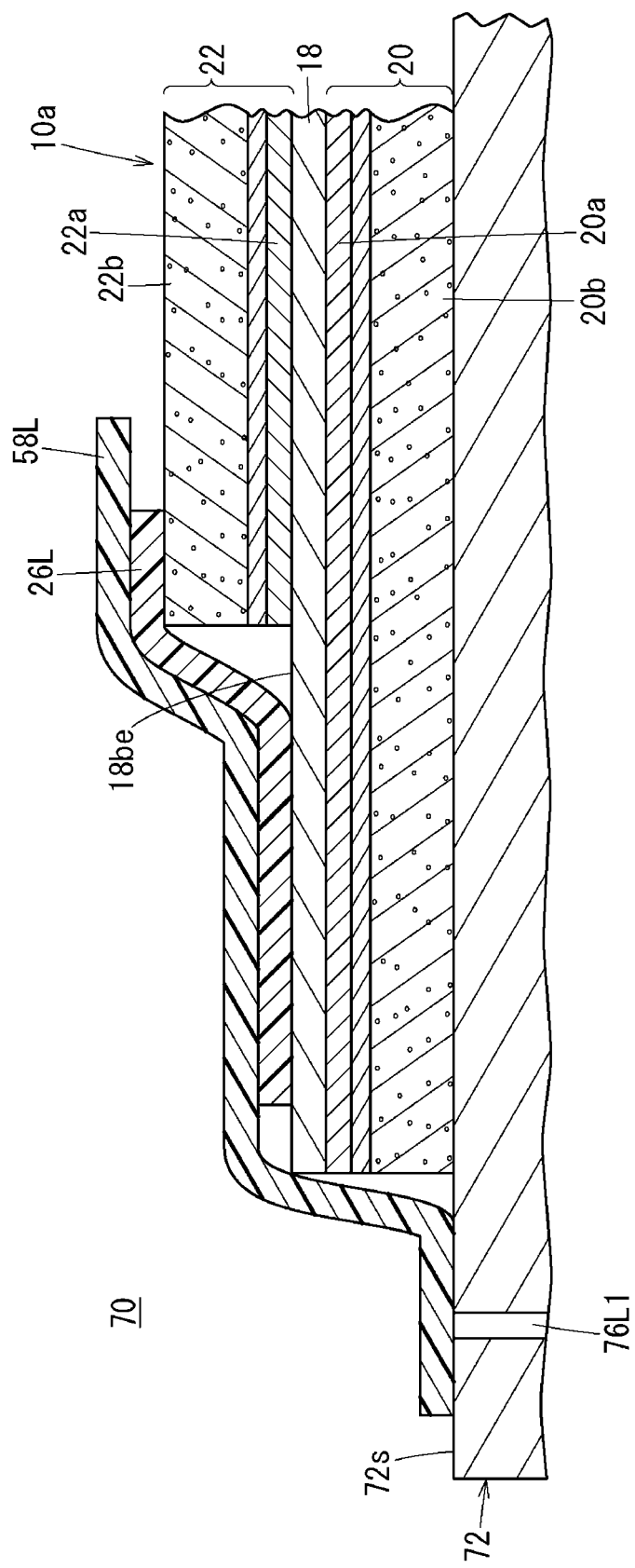
FIG. 10 is a sectional view illustrating the adhesive film affixed to the one long side of the stepped MEA.

Referring to FIG. 10, at this time, the adhesive film 26L is placed on the exposed surface 18be of the solid polymer electrolyte membrane 18 so that a part of the adhesive film 26L overlaps an edge portion of the second gas diffusion layer 22b of the cathode electrode 22. In this state, a heater roller (not shown) presses and heats the adhesive film 26L over a predetermined length. When the film member 58L is peeled off, an adhesive film 26S1 is affixed to the one long side of the stepped MEA 10a.

Figure 11:
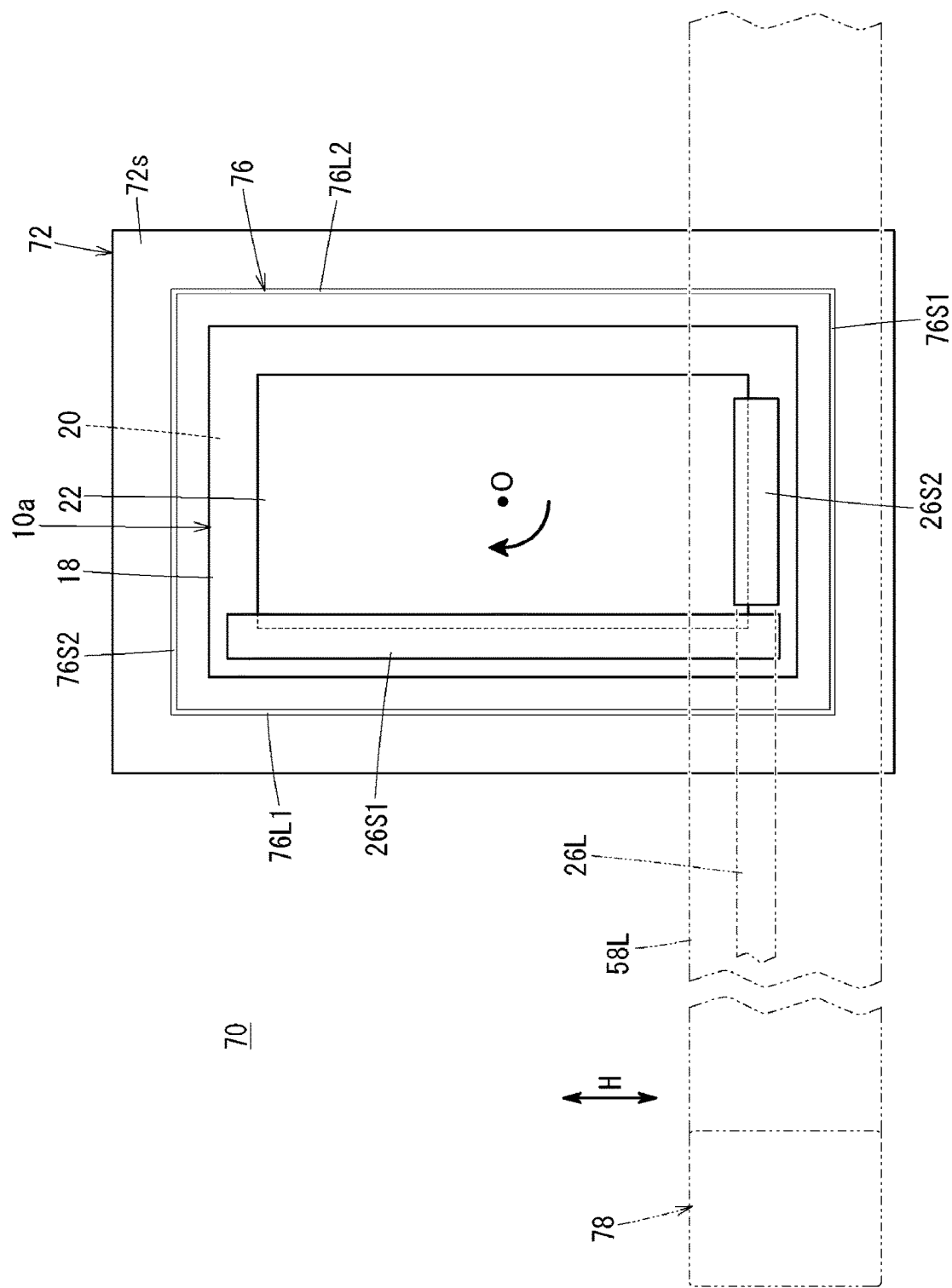
FIG. 11 illustrates an operation of affixing the adhesive film to one short side of the stepped MEA in the manufacturing method.

Next, referring to FIG. 11, the worktable 72 is rotated by using the rotation mechanism 74 around the axis O by 90°. Thus, one short side of the stepped MEA 10a, to which the adhesive film 26L is to be affixed next, is positioned in an area to which the film member 58L is dispensed. In order to adjust the relative positions of the worktable 72 and the film roll 78, the position of the worktable 72 or the film roll 78 in the direction of arrow H is adjusted.

The film member 58L is dispensed from the film roll 78, and the adhesive film 26L is aligned with one short side of the stepped MEA 10a, which is a predetermined position to which the adhesive film 26L is to be affixed. Only the short-side line 76S1 of the outer suction line 76 of the worktable 72 is sucked. The film member 58L is sucked and held on the upper surface 72s of the worktable 72 so as to overlap the stepped MEA 10a.

In this state, the heater roller (not shown) presses and heats the adhesive film 26L over a predetermined length. When the film member 58L is peeled off, an adhesive film 26S2 is affixed to the one short side of the stepped MEA 10a.

Figure 12:
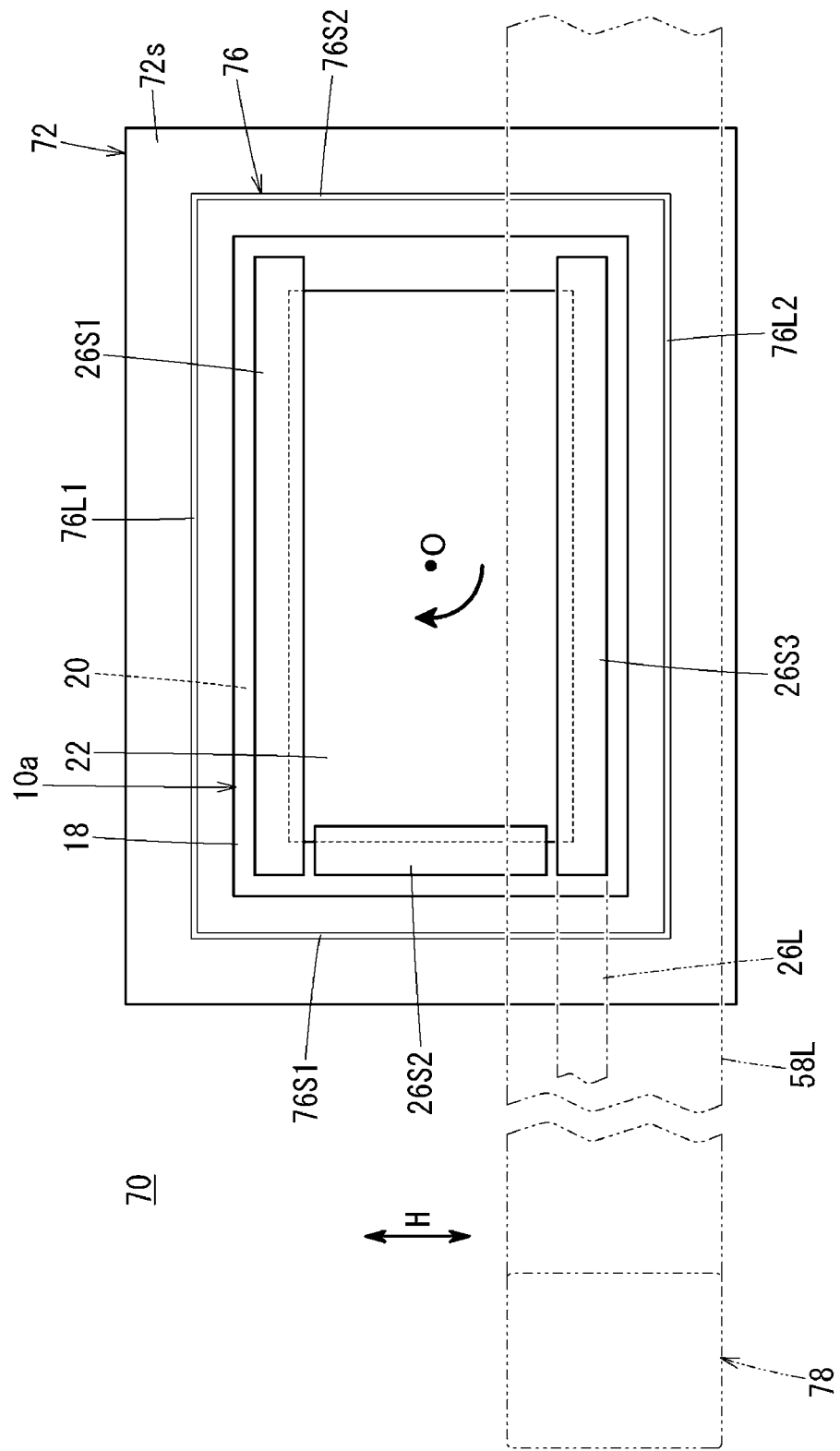
FIG. 12 illustrates an operation of affixing the adhesive film to the other long side of the stepped MEA in the manufacturing method.

Referring to FIG. 12, the worktable 72 is rotated by using the rotation mechanism 74 around the axis O by 90°. Thus, the other long side of the stepped MEA 10a, to which the adhesive film 26L is to be affixed next, is positioned in an area to which the film member 58L is dispensed. The relative positions of the worktable 72 and the film roll 78 in the direction of arrow H are adjusted.

The film member 58L is dispensed from the film roll 78, and the adhesive film 26L is aligned with the other long side of the stepped MEA 10a, which is a predetermined position to which the adhesive film 26L is to be affixed. Only the long-side line 76L2 of the outer suction line 76 of the worktable 72 is sucked. The film member 58L is sucked and held on the upper surface 72s of the worktable 72 so as to overlap the stepped MEA 10a.

In this state, the heater roller (not shown) presses and heats the adhesive film 26L over a predetermined length. When the film member 58L is peeled off, an adhesive film 26S3 is affixed to the other long side of the stepped MEA 10a.

Figure 13:
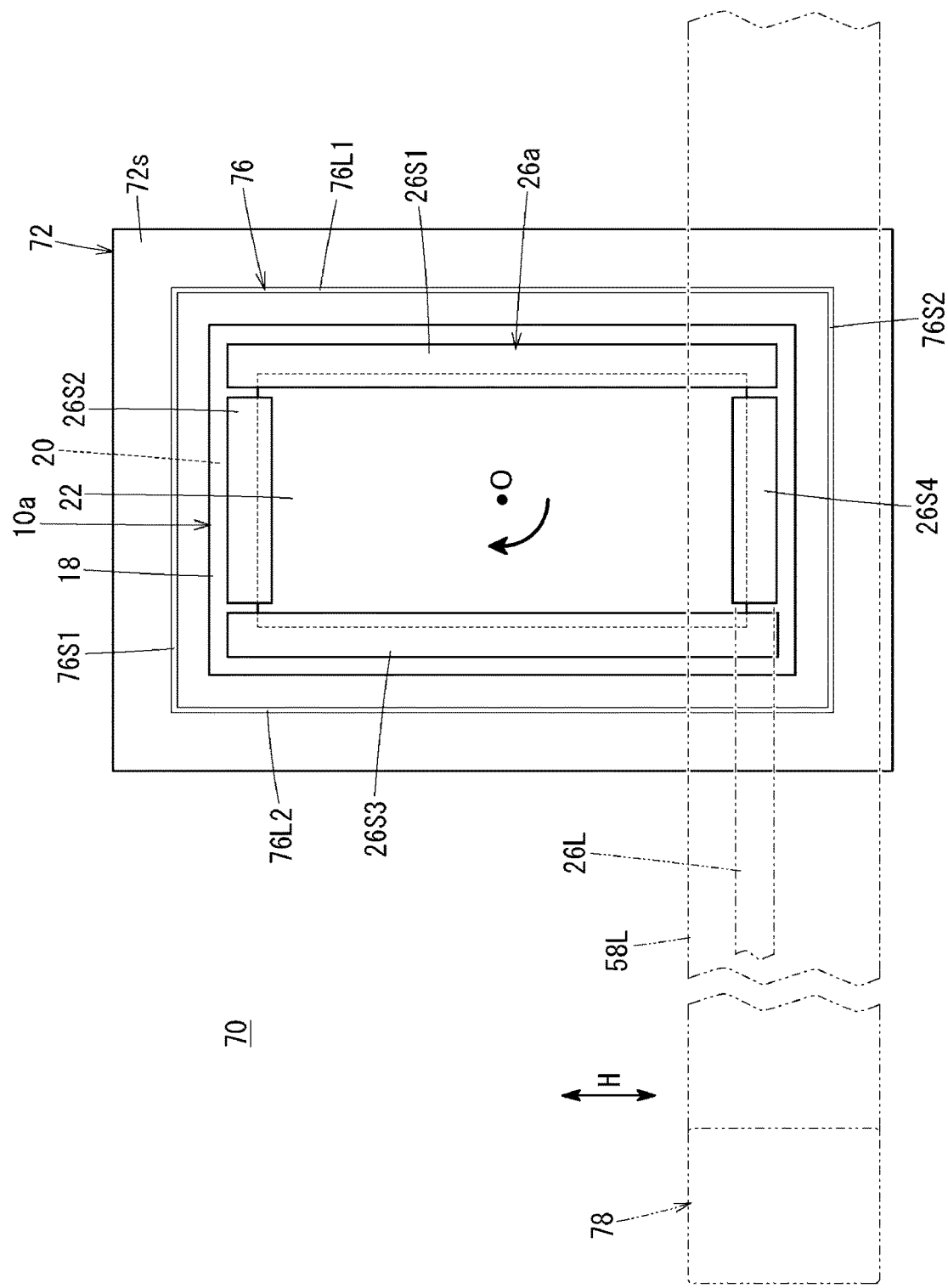
FIG. 13 illustrates an operation of affixing the adhesive film to the other short side of the stepped MEA in the manufacturing method.

Referring to FIG. 13, the worktable 72 is rotated by using the rotation mechanism 74 around the axis O by 90°. Thus, the other short side of the stepped MEA 10a, to which the adhesive film 26L is to be affixed next, is positioned in an area to which the film member 58L is dispensed. The relative positions of the worktable 72 and the film roll 78 in the direction of arrow H are adjusted.

The film member 58L is dispensed from the film roll 78, and the adhesive film 26L is aligned with the other short side of the stepped MEA 10a, which is a predetermined position to which the adhesive film 26L is to be affixed. Only the short-side line 76S2 of the outer suction line 76 of the worktable 72 is sucked. The film member 58L is sucked and held on the upper surface 72s of the worktable 72 so as to overlap the stepped MEA 10a.

In this state, the heater roller (not shown) presses and heats the adhesive film 26L over a predetermined length. When the film member 58L is peeled off, an adhesive film 26S4 is affixed to the other short side of the stepped MEA 10a. Thus, the adhesive film 26a, which is frame-shaped, is disposed on the stepped MEA 10a.

As described above, in the second embodiment, the worktable 72 can be rotated by using the rotation mechanism 74 around the axis O, which is perpendicular to the table surface. Therefore, it is possible to form the frame-shaped adhesive film 26a on the stepped MEA 10a by using the film roll 78 including the elongated adhesive film 26L. Accordingly, adhesive films having various shapes can be easily formed, and an advantage is obtained in that the versatility of the method is improved. A gap between adjacent adhesive films 26a can be filled by pressing and heating the adhesive films 26a in postprocessing.

Moreover, because the film roll 78 is used, by replacing various film rolls like cartridges, the method can be used to manufacture various types of resin-framed MEAs. FIG. 14 illustrates an example of a film roll 78a that can be used. The film roll 78a includes an elongated film member 58L. The film member 58L is rolled and includes rectangular frame-shaped adhesive films 26a that are disposed at regular intervals Instead of the frame-shaped adhesive films 26a, the film member 58L may include adhesive films having various shapes, such as circular, triangular, or polygonal shapes. In this case, film rolls including film members, including linear, circular, and polygonal adhesive layers, are prepared beforehand. Then, by replacing a film roll that is set in a manufacturing apparatus with another film roll, the other film roll can be unrolled to dispense another adhesive layer to the worktable.

FIG. 15 illustrates a manufacturing method according to a third embodiment of the present disclosure. In this manufacturing method, a step of partially joining and temporarily fixing the adhesive film 26L and the stepped MEA 10a to each other is performed before affixing an elongated adhesive film 26S1 to the stepped MEA 10a. This step is performed in order to prevent displacement of stepped portions, regardless of whether the shape of the adhesive layer is linear, circular, or polygonal. To be specific, predetermined positions (for example, three positions) on the adhesive film 26L are pressed and heated (or only pressed or only heated) beforehand to form temporarily-fixed portions 82a, 82b, and 82c. Next, by using a heater roller (not shown) and a heating plate having an appropriate shape corresponding to the shape of the adhesive film 26L, the adhesive film 26L is pressed and heated over a predetermined length.

With the third embodiment, when affixing the elongated adhesive film 26S1 to a stepped portion of the stepped MEA 10a, occurrence of meandering of the adhesive film 26S1 along the affixing direction (the direction of arrow F) can be reliably suppressed. Thus, an advantage is obtained in that the adhesive film 26a can be affixed with high accuracy not only to a flat portion but also to a stepped portion.

In a manufacturing method according to a fourth embodiment of the present disclosure, for example, the adhesive films 26S1, 26S2, 26S3, and 26S4 are affixed to the stepped MEA 10a in the same way as in the second embodiment illustrated in FIGS. 9, 11, 12, and 13.

Referring to FIG. 9, in the fourth embodiment, an adhesive-layer initial position, an adhesive-layer terminal position, and an adhesive-layer length are measured for each of the adhesive films 26S1 to 26S4 on the stepped MEA 10a. Referring to FIG. 16, in the manufacturing apparatus, the adhesive film 26L is cut or punched at cutting portions 80 on the basis of the measured positions and length, and the adhesive film 26L is transferred onto the worktable 72.

Thus, with the fourth embodiment, because the adhesive film 26L is cut in accordance with the positions on the stepped MEA 10a to which adhesive layers are to be affixed, the initial positions of the adhesive films 26S1 to 26S4 can be accurately set and the accuracy of affixing the adhesive films 26S1 to 26S4 can be improved easily.

The present disclosure relates to a method and an apparatus for manufacturing a resin-framed membrane electrode assembly for a fuel cell, the resin-framed membrane electrode assembly including a stepped MEA and a resin frame member. The stepped MEA includes a solid polymer electrolyte membrane, a first electrode disposed on one surface of the solid polymer electrolyte membrane, and a second electrode disposed on the other surface of the solid polymer electrolyte membrane. The first electrode has planar dimensions larger than those of the second electrode. The resin frame member is joined to an outer peripheral surface of the solid polymer electrolyte membrane by using a frame-shaped adhesive layer, the outer peripheral surface being exposed outward from the second electrode.

In the manufacturing method, in a state in which the stepped MEA is sucked and held on a worktable by using a first suction mechanism, a film member including the adhesive layer is sucked and held by using a second suction mechanism so that the adhesive layer overlaps the stepped MEA. The film member is peeled off after the adhesive layer has been affixed to the stepped MEA; and the stepped MEA and the resin frame member are joined to each other by using the adhesive layer.

In the manufacturing method, preferably, a film roll in which the film member including the adhesive layer is rolled is prepared and the film roll is unrolled to dispense the adhesive layer to the worktable. In this case, preferably, the stepped MEA is positioned in accordance with a position to which the adhesive layer is to be affixed by rotating the worktable around an axis perpendicular to a table surface of the worktable.

In the manufacturing method, preferably, the adhesive layer and the stepped MEA are partially joined and temporarily fixed to each other before affixing the adhesive layer to the stepped MEA.

In the manufacturing method, preferably, a film roll in which the film member including the adhesive layer is rolled is prepared and the film roll is unrolled to dispense the adhesive layer to the worktable. In this case, preferably, an adhesive-layer initial position, an adhesive-layer terminal position, and an adhesive-layer length on the stepped MEA are measured; and the adhesive layer is cut on the basis of the measured positions and length and transferred onto the worktable.

The manufacturing apparatus includes a first suction mechanism that sucks and holds the stepped MEA on a worktable, and a second suction mechanism that sucks and holds a film member including the adhesive layer by using a second suction mechanism so that the adhesive layer overlaps the stepped MEA in a state in which the stepped MEA is sucked and held by the first suction mechanism.

With the present disclosure, the stepped MEA is sucked and held on the worktable by using the first suction mechanism while utilizing, for example, a characteristic of an ion-exchange membrane in that the membrane allows slight air leakage. Moreover, the film member including the adhesive layer is sucked and held on the worktable by using the second suction mechanism. Accordingly, in particular, even if the adhesive film has a small thickness, because the adhesive film is included in the film member, the adhesive layer can have sufficiently rigidity and can be handled easily.

In addition, the adhesive layer is sucked and held on the stepped MEA by using the film member. Therefore, an advantage is obtained in that, through a simple process, the thin adhesive layer can be accurately and reliably affixed to a desired position on the stepped MEA, and the stepped MEA and the resin frame member can be joined to each other with high accuracy.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a resin-framed membrane electrode assembly for a fuel cell, the resin-framed membrane electrode assembly including
 a stepped MEA that includes
  a solid polymer electrolyte membrane,
  a first electrode disposed on one surface of the solid polymer electrolyte membrane, and
  a second electrode disposed on the other surface of the solid polymer electrolyte membrane,
  wherein the first electrode has planar dimensions larger than those of the second electrode, and
 a resin frame member that is joined to an outer peripheral surface of the solid polymer electrolyte membrane by using a frame-shaped adhesive layer, the outer peripheral surface being exposed outward from the second electrode,
the method comprising:
 a step of sucking and holding the stepped MEA on a worktable by using a first suction mechanism, the stepped MEA being provided on the worktable such that a second suction mechanism is provided outside of the stepped MEA to surround the stepped MEA;
 a step of sucking and holding a film member including the adhesive layer by using the second suction mechanism so that the adhesive layer overlaps the stepped MEA in a state in which the stepped MEA is sucked and held by the first suction mechanism, the film member extending from the stepped MEA to the second suction mechanism when the film member is sucked and held;

a step of peeling off the film member after the adhesive layer has been affixed to the stepped MEA; and a step of joining the stepped MEA and the resin frame member to each other by using the adhesive layer.

2. The method according to claim 1, further comprising:
a step of preparing a film roll in which the film member including the adhesive layer is rolled and unrolling the film roll to dispense the film member to the worktable; and a step of positioning the stepped MEA in accordance with a position to which the adhesive layer is to be affixed by rotating the worktable around an axis perpendicular to a table surface of the worktable.

3. The method according to claim 1, further comprising:
a step of partially joining and temporarily fixing the adhesive layer and the stepped MEA to each other before affixing the adhesive layer to the stepped MEA.

4. The method according to claim 1, further comprising:
a step of preparing a film roll in which the film member including the adhesive layer is rolled and unrolling the film roll to dispense the film member;

a step of measuring an adhesive-layer initial position, an adhesive-layer terminal position, and an adhesive-layer length on the stepped MEA; and a step of cutting the adhesive layer on the basis of the measured positions and length and transferring the adhesive layer onto the worktable.

5. An apparatus for manufacturing a resin-framed membrane electrode assembly for a fuel cell, the resin-framed membrane electrode assembly including
a stepped MEA that includes
a solid polymer electrolyte membrane,
a first electrode disposed on one surface of the solid polymer electrolyte membrane, and
a second electrode disposed on the other surface of the solid polymer electrolyte membrane,
wherein the first electrode has planar dimensions larger than those of the second electrode, and
a resin frame member that is joined to an outer peripheral surface of the solid polymer electrolyte membrane by using a frame-shaped adhesive layer, the outer peripheral surface being exposed outward from the second electrode,
the apparatus comprising:
a first suction mechanism that sucks and holds the stepped MEA on a worktable when the stepped MEA is provided on the worktable such that a second suction mechanism is provided outside of the stepped MEA to surround the stepped MEA; and
the second suction mechanism that sucks and holds a film member including the adhesive layer by using a second suction mechanism so that the adhesive layer overlaps the stepped MEA in a state in which the stepped MEA is sucked and held by the first suction mechanism, the film member extending from the stepped MEA to the second suction mechanism when the film member is sucked and held.

6. A method for manufacturing a resin-framed membrane electrode assembly including a stepped MEA and a resin frame member, the method comprising:
using a first suction mechanism to hold the stepped MEA on a worktable, the stepped MEA being provided on the worktable such that a second suction mechanism is provided outside of the stepped MEA to surround the stepped MEA, the stepped MEA including a solid polymer electrolyte membrane sandwiched between a first electrode and a second electrode having an area smaller than an area of the first electrode;

using the second suction mechanism to hold a film member including the frame-shaped adhesive layer to be placed on the stepped MEA held by the first suction mechanism, the film member extending from the stepped MEA to the second suction mechanism when the film member is sucked and held;

peeling the film member from the stepped MEA after the frame-shaped adhesive layer has been affixed to the stepped MEA; and joining the resin frame member to an outer peripheral surface of the solid polymer electrolyte membrane of the stepped MEA via the frame-shaped adhesive layer, the outer peripheral surface being exposed from the second electrode.

7. The method according to claim 6, further comprising:
preparing a film roll in which the film member including the frame-shaped adhesive layer is rolled and unrolling the film roll to dispense the film member to the worktable; and positioning the stepped MEA in accordance with a position to which the frame-shaped adhesive layer is to be affixed by rotating the worktable around an axis perpendicular to a table surface of the worktable.

8. The method according to claim 6, further comprising:
partially joining and temporarily fixing the frame-shaped adhesive layer and the stepped MEA to each other before affixing the frame-shaped adhesive layer to the stepped MEA.

9. The method according to claim 6, further comprising:
preparing a film roll in which the film member including the frame-shaped adhesive layer is rolled and unrolling the film roll to dispense the film member;

measuring an adhesive-layer initial position, an adhesive-layer terminal position, and an adhesive-layer length on the stepped MEA; and cutting the frame-shaped adhesive layer on the basis of the measured positions and length and transferring the frame-shaped adhesive layer onto the worktable.

10. An apparatus for manufacturing a resin-framed membrane electrode assembly including a stepped MEA and a resin frame member, the apparatus comprising:
a first suction mechanism to hold the stepped MEA on a worktable, the stepped MEA being provided on the worktable such that a second suction mechanism is provided outside of the stepped MEA to surround the stepped MEA, the stepped MEA including a solid polymer electrolyte membrane sandwiched between a first electrode and a second electrode having an area smaller than an area of the first electrode; and the second suction mechanism to hold a film member including a frame-shaped adhesive layer to be placed on the stepped MEA held by the first suction mechanism, the resin frame member being joined to an outer peripheral surface of the solid polymer electrolyte membrane of the stepped MEA via the frame-shaped adhesive layer, the outer peripheral surface being exposed from the second electrode, the film member extending from the stepped MEA to the second suction mechanism when the film member is sucked and held.

* * * * *